Jan. 30, 1951     G. KINSEY     2,539,955
VEHICLE BUMPER
Filed Oct. 27, 1948
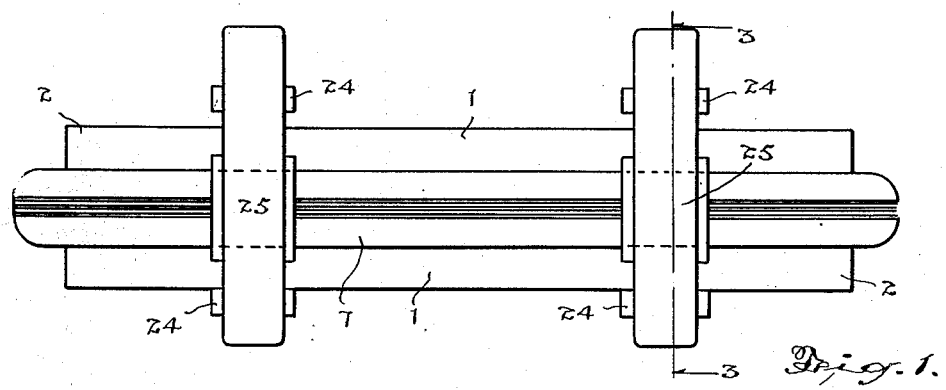
Fig. 1.
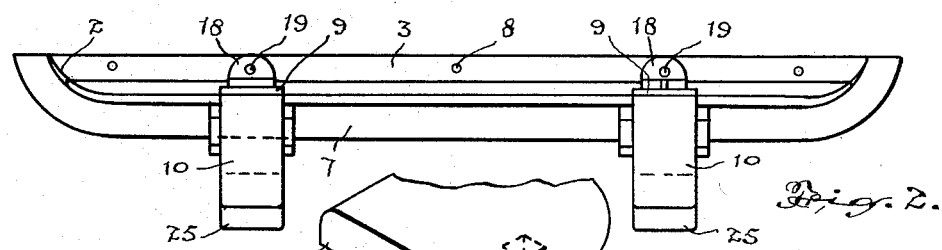
Fig. 2.
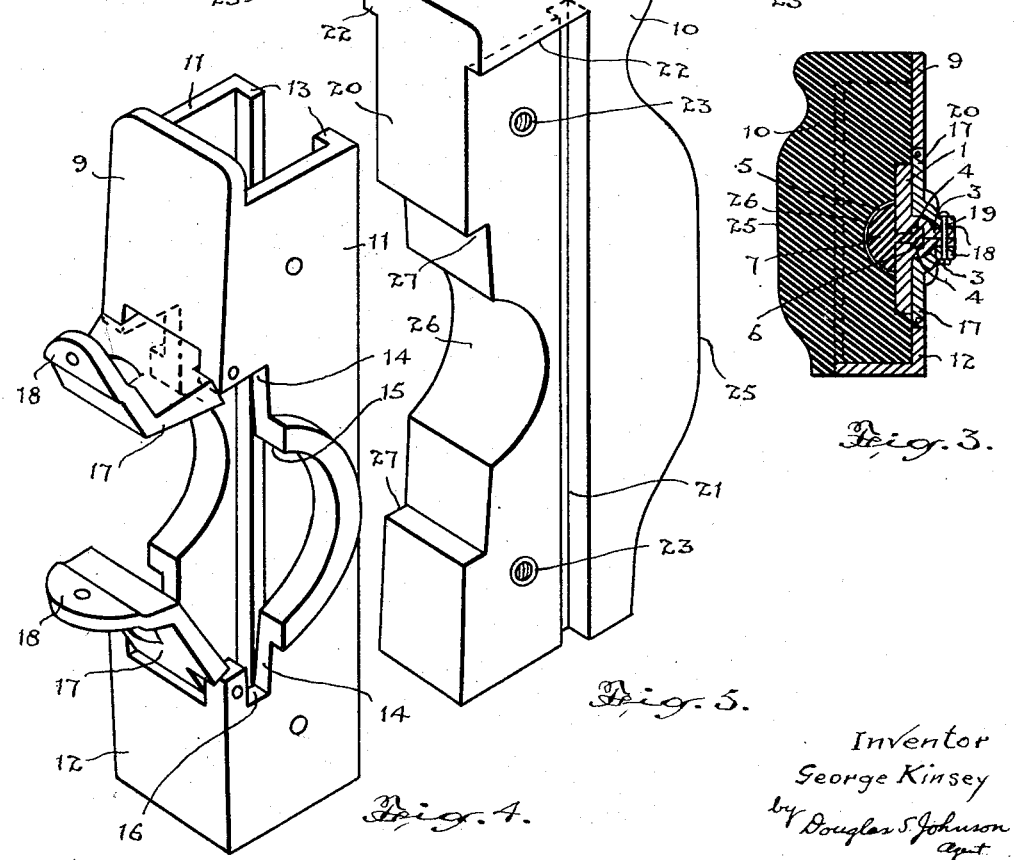
Fig. 3.
Fig. 4.
Fig. 5.
Inventor
George Kinsey
by Douglas S. Johnson
Agent Patented Jan. 30, 1951

2,539,955

UNITED STATES PATENT OFFICE 2,539,955

VEHICLE BUMPER

George Kinsey, Norwood, Ontario, Canada

Application October 27, 1948, Serial No. 56,873

7 Claims. (Cl. 293—67)

This invention relates to improvements in vehicle bumpers and the principal object of the invention is to provide a novel and attractive bumper construction which will eliminate any direct metal-to-metal contact under impact and will effectively cushion and absorb the force of impact when the bumper strikes an object or other vehicle bumper to provide maximum protection against the transmission of shock to the vehicle frame and to greatly reduce damage upon impact.

A further important object is to provide a novel protective bumper construction which can be readily manufactured and assembled and in which the shock-absorbing elements may be readily removed and replaced but will be securely held against dislodgement under impact.

The principal feature of the invention consists in providing a vehicle bumper bar formation with a resilient hard rubber facing strip extending forwardly thereof, mounting on the bumper, bumper uprights or guards carrying forwardly projecting hard rubber cushioning elements to cushion the shock of impact and supported in a manner to transmit the force of the impact back through said resilient hard rubber facing strip to effectively dissipate the force of the impact before reaching the vehicle frame.

A further important feature consists in providing a novel form of interlocking bumper bar construction in which the facing strip is secured to the metal structure of the bumper against dislodgement under impact.

A still further and important feature consists in forming the bumper uprights or guards as frames removably interlocked with the bumper bar construction and providing a further locking action to maintain the bumper bar members and facing strip in interlocked relation.

A still further feature consists in mounting the hard rubber cushioning elements in the bumper uprights for ready removal and replacement.

Referring to the accompanying drawings,

Figure 1 is a front elevational view of a vehicle bumper constructed in accordance with my invention.

Figure 2 is a plan view of the bumper of Figure 1.

Figure 3 is a vertical sectional view taken on the line 3—3 of Figure 1.

Figure 4 is a perspective view of the upright frame of the bumper upright or guard with the resilient cushioning element removed therefrom.

Figure 5 is a perspective view of the cushioning element which is adapted to inter-engage with the frame of Figure 4.

Referring to the drawings, it will be seen that my bumper construction incorporates a pair of transverse bumper bars 1 which are of suitable length to extend across the width of a vehicle, such as an automobile, and which are formed with the somewhat rounded ends 2 which extend rearwardly.

Each of these bars 1, as is shown in Figure 3, is provided with a rearwardly extending flange 3 along one longitudinal edge and each of these flanges is formed with a groove 4 extending longitudinally thereof.

Arranged between the bumper bars 1 is a somewhat T-shaped strip 5 of hard rubber or other resilient cushioning material. The strip is formed with an enlarged base 6 which extends into the groove 4 of the flanges 3 to interlock therewith and is provided with an enlarged rounded head 7, the undersurface of which abuts the outer faces of the bars 1, the head portion extending either side of the body portion compressed between the bars.

The strip 5 is thus interlocked with the bars through the engagement of the base portion 6 with the grooved flanges 3 and is illustrated in Figures 1 and 2. This strip extends longitudinally of the bars and beyond the ends thereof, being curved rearwardly at the ends, as illustrated in Figure 2.

Suitable retaining pins or bolts 8 extending through the flanges 3 of the bars serve to positively maintain the bars and the strip in interlocked relation with the head portions 7 of the strip projecting forwardly of the bars.

The bumper uprights or guards, which are adapted to be secured to the bumper construction comprising the bars 1 and strip 5, are illustrated in Figures 4 and 5 and are shown in position in Figure 3.

Each of these uprights or guards comprises a frame 9, shown in Figure 4, and a resilient cushioning member 10 of hard rubber or the like which engages in interlocking relation in said frame. The frame 9 includes the spaced side walls 11 which are connected adjacent their ends by the rear wall portions 12 and which are formed with vertical inturned flanges 13 extending inwardly from their forward edges.

The rear face of the frame is open between the wall portions 12 and the side walls 11 are notched or cut as at 14 to receive the bars 1, with the notches having a central semi-circular portion 15 to receive the enlarged head 7 of the strip 5.

As will be seen in Figure 4, the lower rear wall portion 12 extends above the end of the notches 14 in the side walls of the frame to define therewith a recess 16 to receive and interlock with the lower edge of the lower bumper bar 1.

Pivotally secured to the rear wall portions 12 are hinge plates 17 which, when swung outwardly to the position of Figure 4, permit the frame to be mounted on the bumper bars 1, but which, when swung to the closed position of Figure 3, engage the inner faces of the bars 1.

These plates 17 are provided with out-turned flanges 18 at their free ends and these flanges or lugs are arranged to overlie the flanges 3 of the bars 1, as shown in Figure 3.

A locking pin or bolt 19, extending through the flanges 18 and through the flanges 3 of the bars 1, securely locks the frame in position on the bumper bars, and further, serves to positively ensure the assembled relation of the bars and the resilient bumper strip 5.

Co-operating with the frame 9 is the cushioning member 10, the body portion 20 of which is shaped to fit within the frame 9, and this body portion is provided with vertical side grooves 21 to receive the inturned flange 13 of the frame to permit the sliding interlock of the cushioning member and the frame.

Formed at the top of the body portion 20 of the cushioning member are shoulders 22 which abut the upper ends of the side walls 11 of the frame to limit the downward movement of the cushioning member when it is inserted into the frame from the top, as will be readily appreciated.

Extending through the body portion 20 of the member 10 adjacent each end thereof is a transverse threaded sleeve 23 with which co-operate, when the cushioning member is in assembled position within the frame, the bolts or screws 24 which extend through the side walls of the frame.

With the use of these sleeves and retaining bolts the cushioning member is thus held against displacement adjacent the ends so that impact directed through the forwardly extending impact-receiving portion 25 of the cushioning member will act to deform the cushioning member between the sleeves 23.

With the cushioning member 10 assembled within its frame 9 and the frame secured on the bumper bars 1, as shown in Figure 3, the head portion 7 of the strip 5 will project into the rounded portions 15 of the frame side walls 11 and will project within the semi-circular recess 26 provided in the rear face of the cushioning member 10, the notched portions 27 either side of the recess 26 being formed to receive the portion of the bumper bars either side of the strip.

There is preferably provided a slight clearance between the cushioning member 10 and the head of the strip 5 so that upon impact the force of the impact acting directly back against the frame will be adjacent the ends only, while the central portion of the cushioning member 10 will deflect or distort under the impact to engage and then distort the cushioning head 7 of the strip 5.

With this arrangement a large proportion of the energy at impact is transmitted and dissipated through the compression and distortion of the contacting resilient hard rubber cushioning members, and the force of the impact actually transmitted to the vehicle frame will be reduced to a minimum.

On impact it will be appreciated that no metal-to-metal contact will occur and the maximum dissipation of energy will be effected with the use of engaging resilient hard rubber surfaces to initially absorb the blow before it is carried to the rigid metal structure of the bumper.

From the foregoing it will be readily appreciated that my bumper unit will adequately protect the vehicle to which it is secured and will minimize the shock transmitted to the vehicle frame and will further eliminate completely the marring of polished metal surfaces when the vehicle strikes an object.

Further, with my arrangement an exceedingly attractive bumper is provided and with the arrangement of interlocking bumper members and interlocking bumper guard frames the unit will be a sturdy integrally secured bumper structure.

It will further be appreciated that the various bumper members may be quickly and readily assembled and may be as readily removed for replacement, enhancing the practicability of the construction.

Should, for instance, the cushioning members 10 require replacement the bolts 24 can be readily removed, the member 10 slid upwardly and removed from the frame 9 and the new member inserted.

While I have shown the use of two uprights or bumper guards constituted by the frames 9 and cushioning members 10, it will be understood that the number and spacing of these guards may be regulated as desired.

While I have shown one particularly advantageous form of frame, other structural arrangements may be resorted to gain the contacting relation between bumper cushion guards and a cushioning element carried on the transverse bumper bar without departing from the scope of my invention.

What I claim as my invention is:

1. In a vehicle bumper, a bumper bar construction having resilient cushioning means extending forwardly thereof, spaced vertical frames secured to said bumper bar construction and engaging over said resilient cushioning means and open to receive said cushioning means to project therewithin, and resilient shock cushioning members mounted in said frames and anchored thereto on opposite sides of said resilient cushioning means and flexible between anchorage to contact under impact said resilient cushioning means projecting within said frames to provide yielding contact surfaces to absorb and dissipate the force of the impact.

2. In a vehicle bumper, a bumper bar construction having a resilient cushioning strip extending forwardly thereof, spaced vertical frames secured to said bumper bar construction and open to receive said strip projecting therewithin, and resilient shock cushioning members arranged in said frames and fixedly secured thereto adjacent the ends with the central portion overlying said strip and flexible between the fixed ends to contact said strip under impact to provide a shock-absorbing cushioning effect therebetween.

3. In a vehicle bumper, a pair of bumper bars each formed with a grooved locking flange extending from one longitudinal edge thereof, a resilient hard rubber strip engaged between said bumper bars and formed with a locking flange engaging in the grooves of said bar flanges and having a head portion engaging the outer faces of said bars and extending forwardly thereof, frames secured to said bumper bars and open to receive said head portions projecting therewithin, resilient hard rubber cushioning members supported in and extending forwardly of said frames and overlying said hard rubber strip projecting therewithin to transmit impact shock thereto through contacting resilient surfaces.

4. In a vehicle bumper, a pair of transverse vertically spaced bumper bars having a resilient hard rubber strip locked therebetween and formed with a head portion lying against the outer faces of said bars, a pair of upright frames mounted on said bars and abutting the forward faces thereof, openings in the rearward faces of said frames to receive the head portion of said strip, upright resilient hard rubber cushioning members mounted in and projecting forwardly of said frames to contact the head portion of said strip extending within said frames, pin means extending through said upright cushioning members and said frames above and below said strip head portion and permitting the central portions of said upright cushioning members between said pin means to deform under impact against the head portion of said strip to transmit and dissipate the force of impact through the engaging cushioning surfaces of said upright cushioning members.

5. A device as claimed in claim 4 in which each of said frames has an open front through which the cushioning member supported therein extends, an opening in the rearward wall of said frame shaped to receive said bumper bars and said cushioning strip, and plates hingedly supported by said rear wall either side of the opening therein to engage over said bars to permit said frame to be removably locked to said bars and to maintain said bars in interlocked relation with said cushioning strip.

6. A device as claimed in claim 4 in which the cushioning member in each of said frames is provided with a transverse threaded sleeve adjacent each end thereof, and retaining bolts extending through the side walls of said frame engage in said sleeve to comprise with said sleeve said pin means.

7. In a vehicle bumper, a bumper bar construction having a resilient cushioning strip extending forwardly thereof, a pair of spaced vertical frames open at the front and rear faces, resilient shock cushioning members supported in said frames and fixed thereto adjacent the ends and extending forwardly thereof and exposed through the open rear faces of said frames, and means removably securing said frames and shock cushioning members to said bumper bar construction with said cushioning strip received in the open rear faces of said frame, the exposed portions of said shock cushioning members exposed through the open rear faces of said frames being shaped to receive said cushioning strip while fitting the bumper bar construction on opposite sides of said strip, said strip and members upon impact providing contacting yielding surfaces to absorb and dissipate force of impact.

GEORGE KINSEY.

REFERENCES CITED

The following references are of record in the file of this patent:

UNITED STATES PATENTS

| Number | Name | Date |
| --- | --- | --- |
| 1,446,708 | Kunkel | Feb. 27, 1923 |
| 1,532,487 | Hayes | Apr. 7, 1925 |
| 1,709,494 | Shoemaker | Apr. 16, 1929 |
| 1,881,231 | Jackson | Oct. 4, 1932 |
| 1,896,277 | Barry | Feb. 7, 1933 |